(12) United States Patent
Kobayashi et al.

(10) Patent No.: US 11,221,423 B2
(45) Date of Patent: Jan. 11, 2022

(54) PROCESSING APPARATUS, SYSYEM, X-RAY MEASUREMENT METHOD, AND PROGRAM

(71) Applicant: Rigaku Corporation, Akishima (JP)

(72) Inventors: Shintaro Kobayashi, Akishima (JP);
Yasukazu Nakae, Akishima (JP);
Takuto Sakumura, Akishima (JP);
Yasutaka Sakuma, Akishima (JP)

(73) Assignee: RIGAKU CORPORATION, Akishima (JP)

( * ) Notice: Subject to any disclaimer, the term of this patent is extended or adjusted under 35 U.S.C. 154(b) by 0 days.

(21) Appl. No.: 17/078,626

(22) Filed: Oct. 23, 2020

(65) Prior Publication Data
US 2021/0124066 A1 Apr. 29, 2021

(30) Foreign Application Priority Data
Oct. 24, 2019 (JP) .............................. JP2019-193745

(51) Int. Cl.
*G01T 1/24* (2006.01)
*G01T 1/166* (2006.01)
*G01T 1/17* (2006.01)

(52) U.S. Cl.
CPC ............ *G01T 1/247* (2013.01); *G01T 1/1663* (2013.01); *G01T 1/171* (2013.01)

(58) Field of Classification Search
CPC ....... G01T 1/247; G01T 1/1663; G01T 1/171; G01T 1/18; G01T 1/24
USPC ..................................................... 250/370.09
See application file for complete search history.

(56) References Cited

U.S. PATENT DOCUMENTS

| 9,081,103 B2 | 7/2015 | Loeliger et al. |
| 2014/0191136 A1 | 7/2014 | Loeliger et al. |
| 2015/0063527 A1 | 3/2015 | Daerr et al. |
| 2019/0146098 A1* | 5/2019 | Roessl .................... G01T 1/247 250/252.1 |

FOREIGN PATENT DOCUMENTS

| JP | 2012-13563 A | 1/2012 |
| JP | 2014-527162 A | 10/2014 |
| WO | WO 2013/144812 A2 | 10/2013 |

OTHER PUBLICATIONS

Extended European Search Report dated Mar. 5, 2021 in corresponding EP Application No. 20 201 937.8.

* cited by examiner

*Primary Examiner* — David P Porta
*Assistant Examiner* — Gisselle M Gutierrez
(74) *Attorney, Agent, or Firm* — Birch, Stewart, Kolasch & Birch, LLP

(57) ABSTRACT

There are provided a storage section 220 that stores an output value read out by counting a pulse signal of incident X-rays, by a photon-counting type semiconductor detector; and a calculation section 230 that calculates a count value based on the output value that has been read out, wherein the calculation section 230 uses a model in which an apparent time constant of the pulse signal monotonously decreases against increase in pulse detection ratio with respect to exposure. According to such a model, the corresponding apparent time constant is able to be obtained even in any higher count rate. As a result of this, reduced can be the influence of count loss even on the count rate that has not been able to be covered by the conventional method.

10 Claims, 14 Drawing Sheets

PROCESSING APPARATUS, SYSYEM, X-RAY MEASUREMENT METHOD, AND PROGRAM

TECHNICAL FIELD

The present invention relates to a processing apparatus with a photon-counting type semiconductor detector, and to a system, an X-ray measurement method and a program thereof.

RELATED ART

The photon-counting type semiconductor detector used for a radiation measurement measures an intensity of X-rays by counting the number of times when an intensity of a pulse signal detected in a predetermined time exceeds a threshold, as the number of pulse signals. However, when the next pulse signal is generated in a situation where the intensity of the pulse signal exceeds the threshold, the pulse signal cannot be counted, and thus count loss thereof occurs. When the intensity of X-rays is too high, the count loss occurs frequently, and the measured intensity of X-rays is consequently estimated to be lower than the actual intensity of X-rays.

A method of correcting the measured count value has been investigated as a method of reducing influence of count loss like these(for example, Patent Document 1). Further, a method of counting pulses in such a manner that the count value approaches a true count during measurement is taken into consideration (for example, Patent Document 2).

Patent Document 1 discloses a radiation measuring apparatus comprising a wave height discriminator 3 that outputs a digital pulse signal when an analog pulse signal output from a radiation detector 1 satisfies a predetermined condition and a signal channel wave height analyzer 4. The radiation measuring apparatus disclosed in Patent Document 1 counts digital pulse signals output from respective a first counter 5 and a second counter 6 to output count values M and P, and a calculator 7 correcting count loss and erroneous counting, referring to count loss correction tables 81 and 82 stored in a memory 8, with respect to count rates m and p obtained from count values M and P. Each of the correction tables finds resolution time t1 of pile-up and proximity time t2 during which the erroneous counting occurs, by making a double pulse be proximate with an experimentally generated pseudo signal pulse, to determine a primary correction count rate n and a secondary correction count rate (n−q).

A method for photon counting imaging with high-rate counting performance improved by applying an instant retrigger capability provided with adjustable dead time in cells of a detector array, and an apparatus thereof, are disclosed in the Patent document 2. That is, as long as a signal pulse initially exceeds a threshold and subsequently exceeds the threshold, the method and the apparatus disclosed in Patent Document 2 reduce influence of the count loss by counting the number of dead time intervals of a predetermined width included in a time exceeding the threshold of the signal pulse and regarding the value as the number of photons arrived in a time higher than the threshold of the signal pulse.

PATENT DOCUMENT

[Patent Document 1] Japanese Unexamined Patent Application Publication No. 2012-013563
[Patent Document 2] Japanese Unexamined Patent Application Publication (Translation of PCT Application) No. 2014-527162

However, according to the radiation measurement device disclosed in Patent Document 1, the correction table performs correction by making a double pulse be proximate with the experimentally generated pseudo signal pulse to find the resolution time t1 of pile-up and the proximity time t2 during when the erroneous counting occurs, and thus accuracy of the correction becomes insufficient when the count rate is increased to such an extent that proximity of three or more pulses occurs frequently. Further, according to the method disclosed in Patent Document 2, the dead time is constant with respect to increase of the count rate, and thus accuracy of the correction becomes insufficient with increase of the count rate.

SUMMARY OF THE INVENTION

The present invention is made in view of such a situation, and it is an object to provide a processing apparatus capable of reducing influence of count loss even on a higher count rate that has not been able to be covered by a conventional method, and to provide a system, an X-ray measurement method and a program thereof.

(1) In order to achieve the above-described object, it is a feature that the processing apparatus according to the present invention is a processing apparatus comprising a storage section that stores an output value read out by counting a pulse signal of incident X-rays, by a photon-counting type semiconductor detector; and a calculation section that calculates a count value based on the output value that has been read out, wherein the calculation section uses a model in which an apparent time constant of the pulse signal monotonously decreases against increase in pulse detection ratio with respect to exposure.

According to such a model in which the apparent time constant of the pulse signal monotonously decreases against increase in pulse detection ratio, the corresponding apparent time constant is obtained even in any higher count rate. As a result of this, reduced can be influence of count loss even on the higher count rate that has not been able to be covered by the conventional method.

(2) Further, it is a feature that the processing apparatus according to the present invention is the processing apparatus, wherein the pulse detection ratio corresponds to a rate of a total time during which the pulse signal is detected with respect to the exposure, to a total time of the exposure. In this manner, the pulse detection ratio can be easily calculated using a detector that is capable of exposing in a short period and in a short unit time.

(3) Further, it is a feature that the processing apparatus according to the present invention is the processing apparatus, wherein the apparent time constant is a true time constant when the pulse detection ratio is zero. In this manner, there is no influence on count loss when there is no overlapping of pulses with respect to the exposure, and thus the model becomes realistic.

(4) Further, it is a feature that the processing apparatus according to the present invention is the processing apparatus, wherein the apparent time constant is a product of the true time constant and a constant smaller than 1 when the pulse detection ratio is 1. In this manner, the count can be calculated even with respect to the maximum measurable output according to the model.

(5) Further, it is a feature that the processing apparatus according to the present invention is the processing apparatus, wherein the storage section stores a time constant of the pulse signal, and when using the model, the calculation section reads out and uses the stored time constant. In such a manner, the time constant can be read out and used when calculating the count value.

(6) Further, it is a feature that the system according to the present invention is a system comprising the semiconductor detector, and the processing apparatus according to any one of the above-described (1) to (5). In this manner, the count value can be calculated with the processing apparatus, using the output value obtained from the semiconductor detector.

(7) Further, it is a feature that the system according to the present invention is the system, wherein the exposure is performed in a shorter time than the time constant of the pulse signal with the semiconductor detector. In this manner, a physical phenomenon can be observed at high time resolution. Further, it is not possible to detect three or more pulses at one exposure, and thus load of readout thereof can be reduced. Further, the readout of the output value becomes sufficient in a 2-bit mode, and thus the readout time can be shortened.

(8) Further, it is a feature that, in the processing apparatus according to the present invention, the count value is corrected by being regarded as the pulse signal being counted in a time obtained by adding the time constant of the pulse signal and a unit time of the exposure, in the calculation of the count value. In this manner, the count value detected in a substantial exposure time can be obtained.

(9) Further, it is a feature that the X-ray measurement method according to the present invention is an X-ray measurement method comprising the steps of reading an output value by counting a pulse signal of incident X-rays, by a photon-counting type semiconductor detector; and calculating a count value based on the output value that has been read out, wherein a model in which an apparent time constant of the pulse signal monotonously decreases against increase in pulse detection ratio with respect to exposure is used in the step of calculating the count value. In this manner, reduced can be influence of count loses even on the higher count rate.

(10) Further, it is a feature that the program according to the present invention is a program causing a computer to execute the processes of reading an output value by counting a pulse signal of incident X-rays, by a photon-counting type semiconductor detector; and calculating a count value based on the output value that has been read out, wherein a model in which an apparent time constant of the pulse signal monotonously decreases against increase in pulse detection ratio with respect to exposure is used in the processing of calculating the influence of count loses even on the higher count rate.

According to the present invention, reduced can be influence of count loss even on a higher count rate that has not been able to be covered by a conventional method.

DETAILED DESCRIPTION OF EMBODIMENTS

Figure 1:
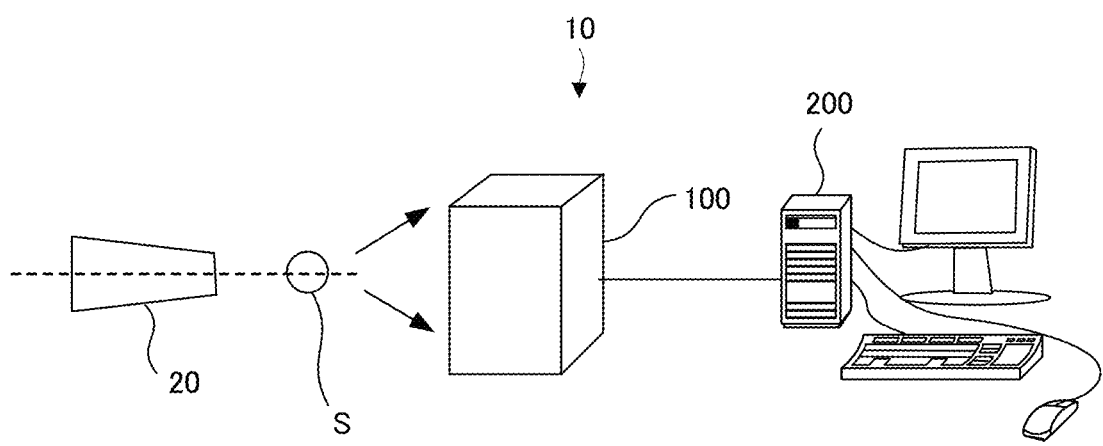
FIG. 1 is a schematic diagram showing an example of a configuration of an X-ray detection system of the present invention.

Next, embodiments of the present invention are described referring to the drawings. In order to facilitate understanding of the description, one same reference number is used for one same constituent element, and overlapping descriptions are omitted in each drawing.

EMBODIMENT (Constitution of Detection System)

FIG. 1 is a schematic diagram showing an example of a configuration of an X-ray detection system 10. As shown in FIG. 1, the X-ray detection system 10 comprises an X-ray source 20, a sample S, an X-ray detector 100 and a processing apparatus 200.

For example, the X-ray source 20 generates X-rays by making electron flux radiated from a filament, which is a cathode, collide with a rotor target, which is an anticathode. Metal such as Mo or Cu, for example, is provided on an outer-peripheral face of the rotor target. When electrons collide with a Mo target, X-rays including MoKα rays (a wavelength of 0.711 Å), which are characteristic rays, are radiated. When electrons collide with a Cu target, X-rays including CuKα rays (a wavelength of 1.542 Å), which are characteristic rays, are radiated. X-rays radiated from the X-ray source 20 are so-called point-focus X-ray beams.

A sample S is supported by a sample support apparatus. The X-ray detector 100 detects, for example, X-rays such as X-rays diffracted by the sample S. The processing apparatus 200 processes the detected output value to calculate the count value. Details of the X-ray detector 100 and the processing apparatus 200 are mentioned below. In addition, it is a featured step according to the present invention that the count value is calculated by using a model in which an apparent time constant of a pulse signal monotonously decreases against increase in pulse detection ratio with respect to exposure. In the following explanation, the explanation is made based on the premise that this step is basically carried out inside the processing apparatus 200, but may also be performed inside the X-ray detector 100.

(Configuration of X-Ray Detector)

Figure 2:
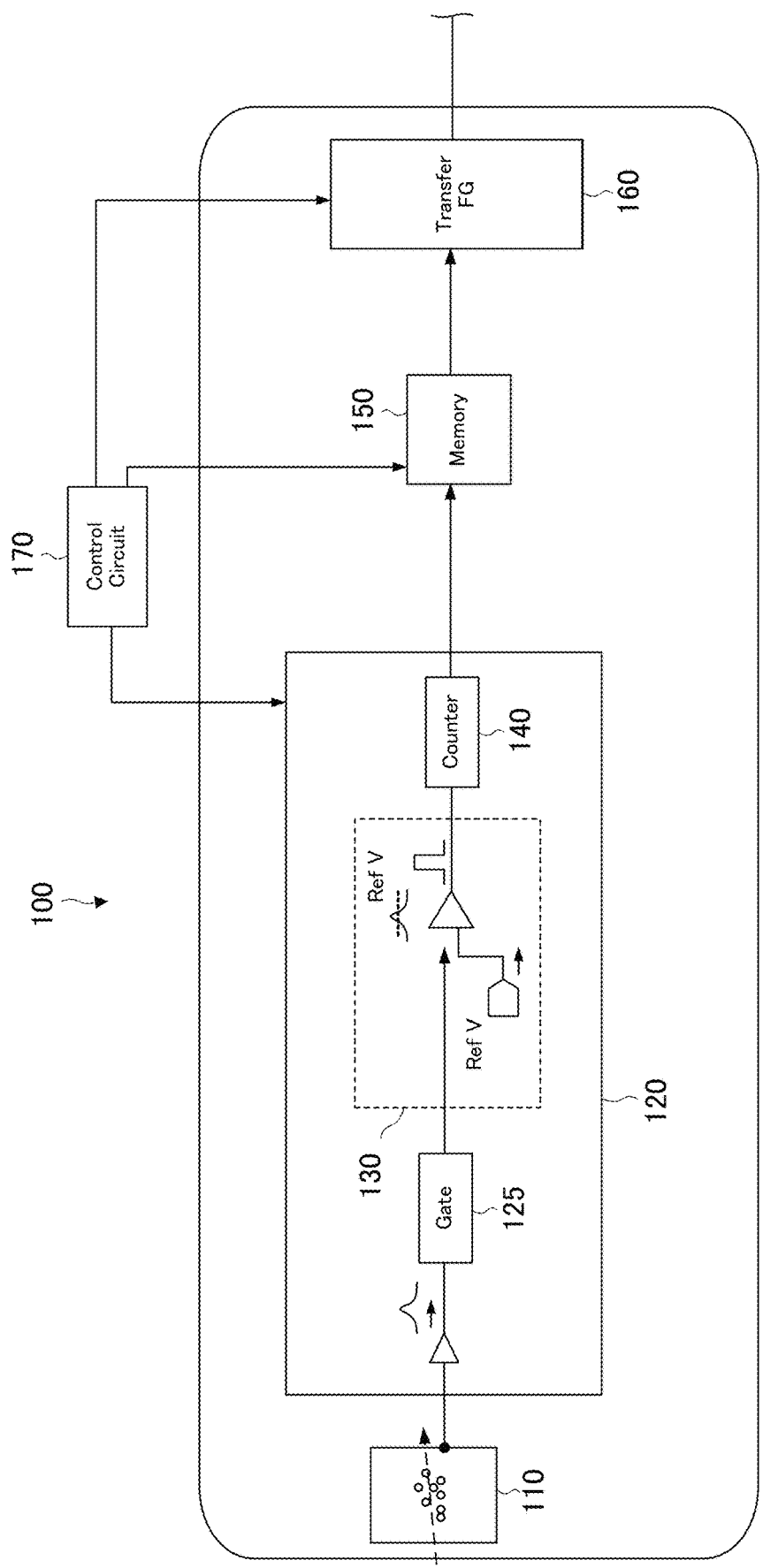
FIG. 2 is a schematic diagram showing a configuration of an X-ray detector according to an embodiment

FIG. 2 is a schematic diagram showing a configuration of an X-ray detector 100. The X-ray detector 100 that is a photon-counting type semiconductor detector has a two-dimensional data buffer function. The X-ray detector 100 detects X-rays, and transfers the detection data outside for every frame. In addition, the X-ray detector 100 may be a one-dimensional detector or a zero-dimensional detector.

As shown in FIG. 2, the X-ray detector 100 comprises a sensor 110, a readout circuit 120, a memory 150, a transfer circuit 160, and a control circuit 170. In addition, in FIG. 2, a configuration for one sensor 110 is shown for convenience, but the X-ray detector 100 is basically provided with a plurality of sensors. The readout circuit 120 provided with a gate 125, a detection circuit 130 and a counter 140 has a readout function.

The sensor 110 generates pulses when X-ray particles are detected by exposure. The sensor 110 can detect the intensity of an X-ray flux incident on a receiving surface as surface information.

The gate 125 makes pulses pass through the detection circuit 130 only for a duration of gate open time. In the present specification, open time of the gate 125 is called an exposure time δt. Opening/closing of the gate 125 is carried out by an electronic shutter. When the exposure time δt is shortened, the time resolution is increased and more accurate measurement is able to be conducted, and thus an exposure time δt is preferable to be shorter. For example, when the exposure time δt is made to be shorter than the time constant τ of the below-mentioned pulse signal, it is not possible to detect three or more pulses at one exposure, and thus load of readout thereof is reduced, which is preferred. According to the exposure time δt, its lower limit is set by the limit of a hardware function, but for example, the lower limit can be lowered by increasing a clock frequency, by making an instruction system of the gate control set a system different from the other controls to perform instruction with 1-bit, by multiplying a clock by a multiple of n (for example, 10 times) only for the gate control inside CPU, or the like.

The detection circuit 130 determines whether or not the pulse is higher than a threshold, and transmits it to the counter 140 as a voltage signal when it is higher. The counter 140 can count the transmitted voltage signal as the number of pulses, and output it as an output value. The memory 150 reads out the output value counted by the counter 140 from the counter 140 to store it. The readout timing is basically preferred to be immediately after closing the gate 125, but the readout after a waiting time is also possible. The memory 150 converts the read-out unordered data into a real space arrangement, and makes it possible to transfer the data to a rear stage. Further, the memory 150 stores the total time of exposure, or the number of times of exposure.

In addition, a plurality of detection circuits may be present for one sensor. When providing the plurality of detection circuits, a counter is presented for each detection circuit. Further, when providing the plurality of detection circuits, a threshold used for determining a pulse can also be made to be different therefrom for each detection circuit.

Further, according to the memory, there may be a plurality of switchable memories for writing, for one sensor. When providing the plurality of memories, a gate can be opened to perform exposure even while reading out one memory, and thus it is possible to raise a duty ratio. Further, when providing a plurality of sensors, a plurality of memories may be independently provided for each of the sensors, and the plurality of memories may be shared. For example, it is enough that two memories are provided for two sensors, and the two memories are present to be able to be switched for writing from each sensor.

The transfer circuit 160 transfers the output value stored in the memory 150, and the total time of exposure or the number of times of exposure to the processing apparatus 200. The control circuit 170 makes the memory 150 store the total time of the exposure or the number of times of the exposure. Further, the control circuit 170 controls opening/closing of the gate 125, controls readout and storage of the output value, and controls transfer of the stored output value, and the total time of the exposure or the number of times of the exposure to the processing apparatus 200.

(Configuration of Processing Apparatus)

Figure 3:
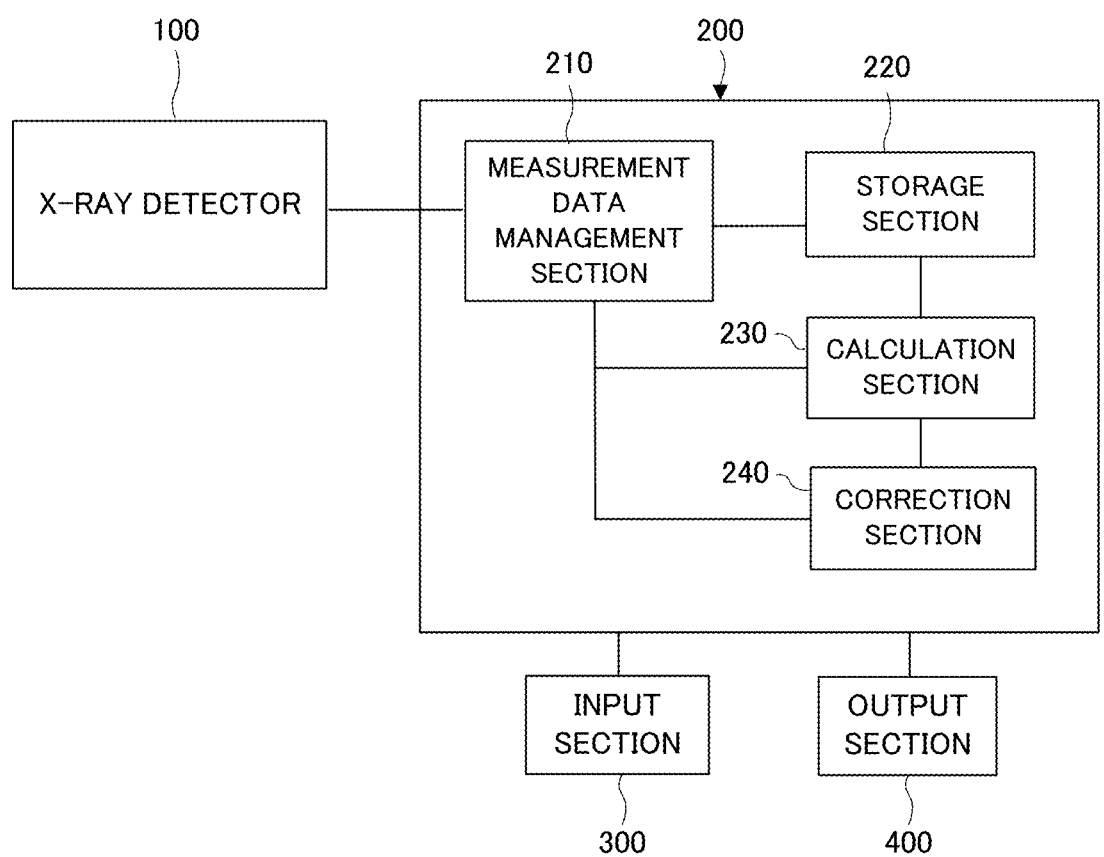
FIG. 3 is a block diagram showing a functional configuration of a processing apparatus according to an embodiment.

FIG. 3 is a block diagram showing a configuration of a processing apparatus 200. The processing apparatus 200 comprising a measurement data management section 210, a storage section 220, a calculation section 230 and a correction section 240, calculates a count value or a count rate, based on an output value of X-rays detected by the X-ray detector 100, and the total time of exposure or the number of times of exposure.

The measurement data management section 210 manages data handled in the storage section 220, the calculation section 230, and the correction section 240. The measurement data management section 210 receives the output value stored in the memory 150 inside the X-ray detector 100, and the total time of the exposure or the number of times of the exposure through the transfer circuit 160, and makes the storage section 220 store them.

The storage section 220 stores the received output value, and the total time of exposure or the number of times of exposure. Further, the storage section 220 stores the count value or the count rate calculated based on the output value, and the total time of exposure or the number of times of the exposure. Further, the storage section 220 stores the total time of exposure that is corrected by the correction section 240. Further, the storage section 220 stores the time constant of a pulse signal.

The time constant read out from the storage 220 is used for calculating the count value and for setting the exposure time. The time constant changes its value depending on a setting value such as a threshold or the like, and thus it is applicable for any processing by storing a table form or the like in advance. In addition, it is possible to be used that the table is stored on the side of X-ray detector 100 and is read out.

The calculation section 230 calculates the count value or the count rate based on the total output value and the time of exposure. At this time, used is a model in which an apparent time constant of a pulse signal monotonously decreases against increase in pulse detection ratio with respect to exposure. Details of the model are mentioned below. Further, the pulse detection ratio can be a value corresponding to a rate of a total time during which the pulse signal is detected with respect to exposure, to a total time of the exposure. The corresponding value means that the total time during which the pulse signal is detected with respect to the exposure can be replaced by the output value, and the total time of exposure can be replaced by the number of times of exposure or the corrected total time of exposure.

The correction section 240 corrects the total time of exposure. Correction of the total time of exposure may be performed in such a manner that an exposure time for one exposure, for example, is set as a time obtained by adding a time constant τ of a pulse signal and a unit time of exposure (exposure time δt) to calculate the total time of exposure. In this manner, the count value detected in a substantial exposure time can be obtained.

The processing apparatus 200 is, for example, a personal computer. The personal computer is provided with, for example, CPU for controlling calculation, a memory for storing data, a system software stored in a predetermined region inside the memory, and an application program software stored in the other predetermined region inside the memory, and so forth.

A keyboard or the like as an input section 300 that receives an input of a user is connected to the processing apparatus 200. Further, an output section 400 such as a display, a printer or the like is connected to the processing apparatus 200. The output section 400 outputs the count value and so forth according to an instruction from the processing apparatus 200.

(X-Ray Measurement Method)

Next, an outline of the X-ray measurement method from detection of X-rays to calculation of count values is explained. When X-rays incident on a detection surface are detected by a sensor, pulses are generated. The pulses are made to pass through the detection circuit in a time during which the gate is opened, by exposure. It is determined whether each of the pulses is higher than respective thresholds in the detection circuit, and the pulses are transmitted to a counter as voltage signals, when being higher. The pulses are counted by the counter. The output at the counter is read out by the memory, and transferred to the processing apparatus by the transfer circuit. In the processing apparatus, the count value is calculated based on the output value that has been read out. In this case, used is a model in which the apparent time constant of the pulse signal monotonously decreases against increase in pulse detection ratio with respect to exposure.

(Time Constant of Pulse Signal)

The time constant τ of a pulse signal means a time during which an intensity of a single pulse signal exceeds a threshold. In the case of a photon-counting type semiconductor detector, the time constant τ depends on an ROIC circuit. According to the present invention, a time constant τ of the original pulse signal is able to be used for setting an exposure condition. Further, this is also able to be used for the correction formula used when calculating the count value. In addition, the measurement method of the time constant is mentioned below as EXAMPLE.

(Counting Method of Pulse Signal According to the Present Invention)

Figure 4:
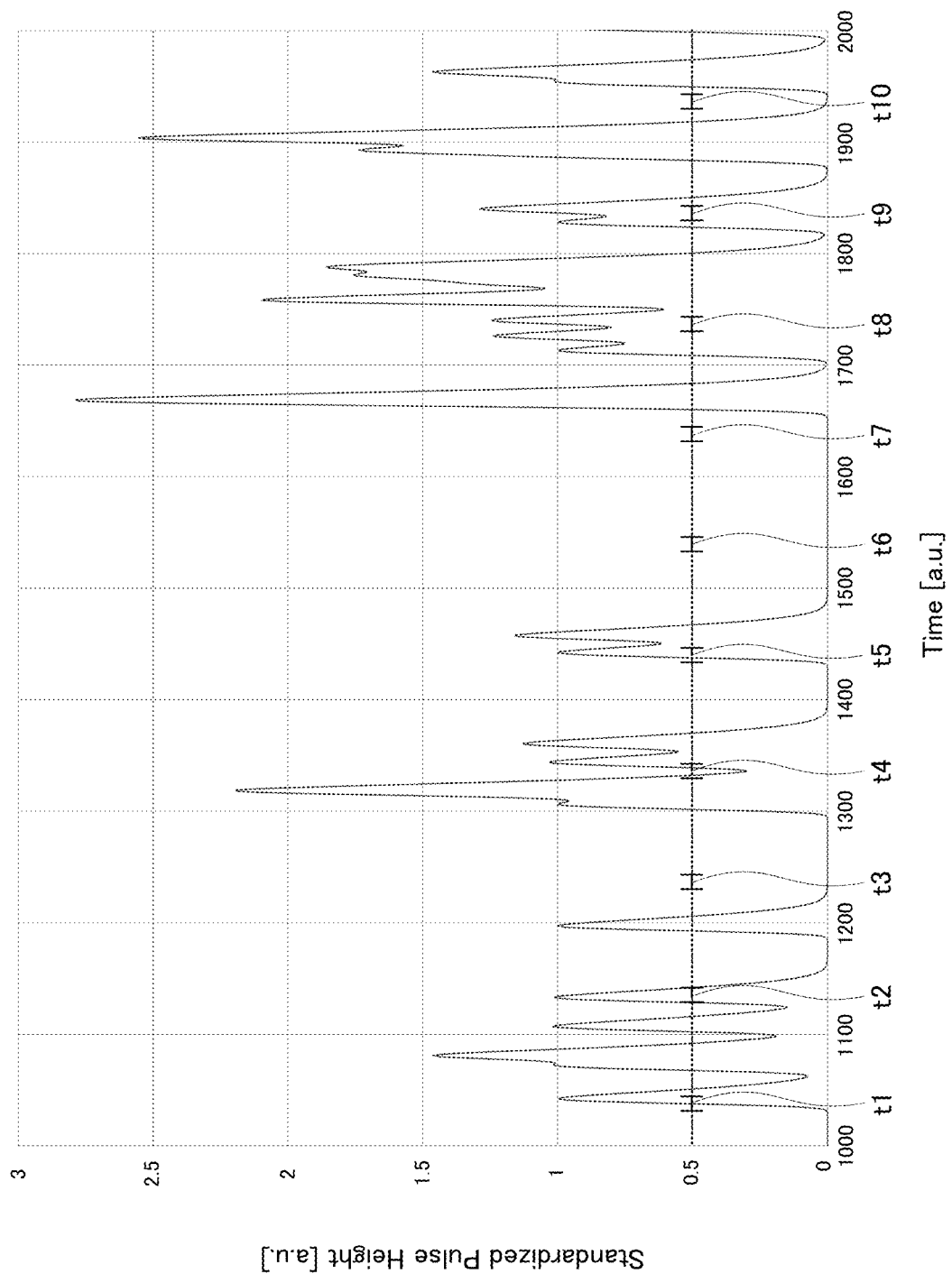
FIG. 4 is a schematic diagram showing count timing of an output value with respect to an input of a pulse according to an X-ray measurement method of the present invention.

FIG. 4 is a schematic diagram showing count timing of a pulse according to an X-ray measurement method of the present invention. Each of t1 to t10 in FIG. 4 indicates an exposure time δt during which the gate is opened. With respect to each of a plurality of these exposure times δt, 1 is added for the count when the pulse intensity exceeds a threshold in the interval. According to the process, also in the case that signal height exceeds the threshold from the beginning, and in the case that signal height exceeds the threshold during the exposure time δt, 1 is added for the count in the same way. Further, when signal height that exceeded a threshold temporarily falls below the threshold, and then exceeds the threshold again, during the exposure time δt, 2 is added for the count. The same applies to the cases of more than that. According to an example of FIG. 4, no plus is given for each of t3, t6, t7 and t10; 1 is added for each of t1, t2, t5, t8 and t9; and 2 is added for t4, thereby resulting in 7 counts in total are added. In addition, each of intervals between the exposure times may not be an equal interval.

According to this counting method, it is preferred that an exposure time δt is set to be shorter than a time constant τ. When the exposure time δt is set to be shorter than the time constant τ, an event in which signal height that exceeded a threshold temporarily falls below a threshold, and then exceeds the threshold again, during the exposure time δt, appears one time or less. That is, the count during the exposure time δt becomes 2 or less. Further, when the exposure time δt is made to be sufficiently short, a V-shaped interval in the decrease/increase of pulse intensity cannot be recognized, and thus the count counted during the exposure time δt becomes 1 or less. The number of pulses counted in a unit exposure time becomes small by shortening the exposure time δt, thereby reducing the error count. When the exposure time δt is made to be shorter than the time constant τ of a pulse signal, detecting three pulses or more at one exposure can be avoided, and thus a transfer information amount can be set to 2 bits or less. Therefore, the readout time can be shortened.

Further, when using an X-ray count value for analysis or the like, it is necessary to have the count value to a degree at which influence of statistical fluctuation is negligible. For example, in order to obtain a relative standard deviation of 1%, it is necessary to count 10,000 counts. In order to make the number of counting times of pulse signal per exposure time δt be any of 0, 1 and 2, it is preferred that the number of times of exposure is set in such a manner that a count of a pulse signal per total time of exposure statistically is a significance value by repeating the exposure with 10,000 to 30,000 counts as an achievement reference.

According to any counting method, a higher count region, for example, a region of 10 Mcps or more is considerably affected by count loss. The processing at the rear stage performs correction for approaching the number of original pulses by correcting the influence of count loss.

It is preferred that the counting result obtained by a counting method of a pulse signal according to the present invention as described above is used as an output value, but each of the results obtained by a method of counting Rising Edge (mentioned below) or a method of retriggering a time-trigger on a circuit of a detector may be used as an output value.

Specifically, the total time obtained by detecting the pulse signal is read out as an output value to calculate the count value of original pulses based on the output value that has been read out. In addition, the total time (output value) obtained by detecting the pulse signal may be used by directly reading out a time during which the pulse signal exceeds the threshold, or be estimated based on the total counts of the pulse signal. A model in which an apparent time constant of the pulse signal monotonously decreases against increase in pulse detection ratio with respect to exposure is used in the calculation of the count value.

(Correction Method with Model in which Apparent Time Constant of Pulse Signal Monotonously Decreases)

Pulse signals are overlapped when X-rays continuously reach a sensor, and a time during which signal height exceeds a threshold becomes long when height of the overlapped pulse signals exceeds the threshold. However, the time during which the threshold is exceeded becomes shorter than a value obtained by multiplying a time constant τ by the number of pulses by an amount of overlapping the pulses. For example, even when two pulses are overlapped, the time during which the threshold is exceeded is shorter than two times of τ, and even when three pulses are overlapped, it is shorter than three times of τ.

In the present specification, a value obtained by converting time during which a threshold is exceeded into time per one pulse signal is referred to as an apparent time constant $\tau_a$ of the pulse signal. The relationship between the number of pulse signals and the apparent time constant $\tau_a$ is represented by Formula (1)

$$N = \frac{T_{up}}{\tau_a} \tag{1}$$

Figure 5:
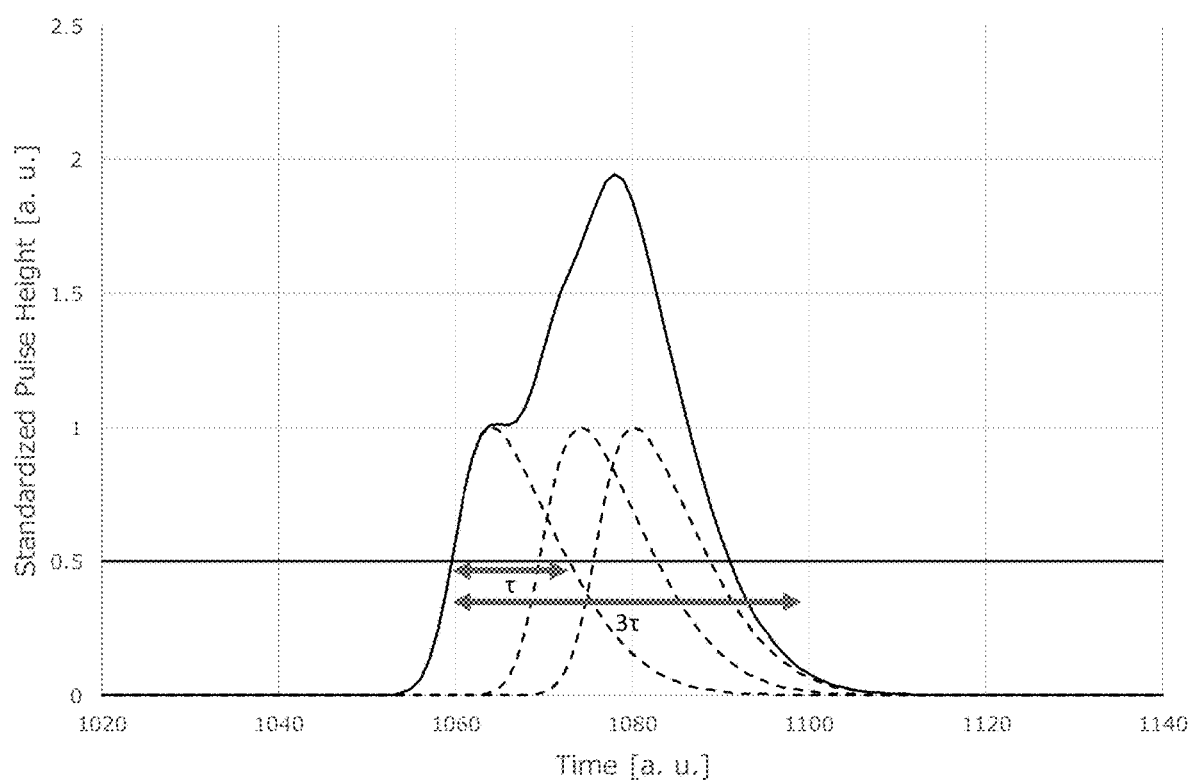
FIG. 5 is a graph showing a pulse height when pulses are overlapped.

FIG. 5 is a graph showing a pulse height when pulses are overlapped. As shown in FIG. 5, when the number of overlapped pulse signals (N) per time ($T_{up}$) during which the pulses are detected increases, the apparent time constant $\tau_a$ gradually becomes shorter.

Such a tendency is associated with the probability of pulse signals overlapping. Then, when the pulse detection ratio (count rate) increases, the number (N) of pulse signals increases, and the probability of pulse signals overlapping also rises. That is, it is possible to calculate the apparent time constant $\tau_a$ from the probability without discriminating how many signals are overlapped. A time per one pulse signal (apparent time constant $\tau_a$) gradually becomes shorter than a time constant τ as the pulse detection ratio (count rate) increases. That is, the apparent time constant $\tau_a$ can be represented by the product of a time constant τ and a monotonous decreasing function f of a count rate. As a result of this, a true count value (N) can be calculated from the relationship between a time $T_{up}$ during which signal height exceeds a threshold, and an apparent time constant $\tau_a$ with respect to a pulse detection ratio (count rate).

(Conditions of Model)

A model in which the count value and the count rate as described above are calculated needs to have the following conditions. (1) The apparent time constant of the pulse signal monotonously decreases against increase in pulse detection ratio. (2) When the pulse detection ratio is 0, the apparent time constant of the pulse signal is identical with the time constant τ. (3) When the pulse detection ratio is 1, the apparent time constant of the pulse signal is smaller than the time constant τ. It is preferred that when the pulse detection ratio approaches 1, the apparent time constant of the pulse signal approaches 0. (4) Each of formulae by which the count value prepared by the model is calculated represents dimensionless quantity. In addition, a value obtained by dividing the count value by the total time of exposure is the count rate.

(Example of Model)

Formula (2) in which the count value N as shown in the following example is calculated can be used as a model. Symbol N represents a calculated count value; τ represents a time constant of a pulse signal; $T_{up}$ represents a total time during which the pulse signal is detected with respect to exposure; and $\tau_{tot}$ represents the total time of exposure. Further, τ·f($T_{up}$, $T_{tot}$) represents the apparent time constant of the pulse signal. The f($T_{up}$, $T_{tot}$) becomes 1 when $T_{up}$ is 0, and monotonously decreases when $T_{up}/T_{tot}$ increases in the range where $T_{up}/T_{tot}$ is larger than 0 and smaller than 1. It is preferred that the f($T_{up}$, $T_{tot}$) approaches 0 when $T_{up}/T_{tot}$ approaches 1, but may become a constant larger than 0 and smaller than 1.

$$N = \frac{T_{up}}{\tau \cdot f(T_{up}, T_{tot})} \tag{2}$$

$$n = \frac{N}{T_{tot}} = \frac{T_{up}}{T_{tot} \cdot \tau \cdot f(T_{up}, T_{tot})} \tag{3}$$

The count rate n shown in Formula (3) is obtained by dividing the count value N shown in Formula (1) by the total time $T_{tot}$ of exposure. It is called monotonous decrease that the function value f($T_{up}/T_{tot}$) always decreases as the argument $T_{up}/T_{tot}$ increases. The f ($T_{up}/T_{tot}$) may be a monotonous decreasing function having such a property. The f($T_{up}/T_{tot}$) may be a n-th order function or an exponential function, thereby being irrespective of a kind of function.

The apparent time constant $\tau_a$ (=τ·f) is the product of the time constant τ and the foregoing monotonous decreasing function, and thus in other words, the apparent time constant $\tau_a$ as well monotonously decreases as the pulse detection ratio increases ($T_{up}/T_{tot}$).

The following Formula (4) is used as a monotonous decreasing function f($T_{up}$, $T_{tot}$) in the following EXAMPLE. This function becomes a monotonous decreasing function by determining k in the range of 0<k≤1. For example, the count rate can be corrected to infinity theoretically by performing experiments as well as a simulation, and further determining an optimum constant m with a count rate range and a system. The count rate n in this case is given as shown in Formula (5).

$$f(Tup/Ttot) = T_{tot} \times \tau \times \left(1 - k \times \frac{T_{up}}{T_{tot}}\right)^m \tag{4}$$

$$n = \frac{T_{up}}{T_{tot} \times \tau \times \left(1 - k \times \frac{T_{up}}{T_{tot}}\right)^m} \tag{5}$$

According to the above-described formulae, the time constant τ changes its value depending on not only a detection circuit but also a pixel setting value. Thus, it is preferred that updating should be carried out depending on the corresponding detector or measurement condition. For example, the value stored as a table form corresponding to the pixel setting value is read out and used by changing the condition to measure the time constant τ.

The time during which the pulse signal is detected, that is, the time during which the pulse signal exceeds the threshold is difficult to be directly read out by a detector according to the embodiment, and thus the total time $T_{up}$ during which the pulse signal is detected with respect to exposure can be estimated and be set as an output value.

For example, according to the method of making the counted counts approach true counts by retriggering a time-trigger with a hardware on a circuit, as is the technique disclosed in Patent Document 2, the time constant τ is constant, and thus a value obtained by multiplying the time constant τ by the number of times of the dead time can be estimated as $T_{up}$.

According to the counting method of the present invention, a value obtained by multiplying the exposure time δt by the total number of counts of pulse signal is set as $T_{up}$. The total time $T_{tot}$ of exposure becomes a value obtained by multiplying the exposure time δt by the number of times of exposure. Further, the pulse detection ratio ($T_{up}/T_{tot}$) corresponds to a ratio of the number of times of exposure to the total number of counts of pulse signal.

The total time $T_{up}$ during which the pulse signal is detected with respect to exposure is represented by the product of the exposure time δt and the number of counts, and the total time $T_{tot}$ of exposure is represented by the product of the exposure time δt and the number of times of exposure (the number of frames). Accordingly, the pulse detection ratio is $T_{up}/T_{tot}$=the number of counts/the number of times of exposure. For these reasons, treated numerical values are simplified by treating the total count number of pulse signal and the number of times of exposure as an output signal, and thus a load of processing thereof is reduced.

(Relationship Between Exposure Time and Time Constant)

Figure 6:
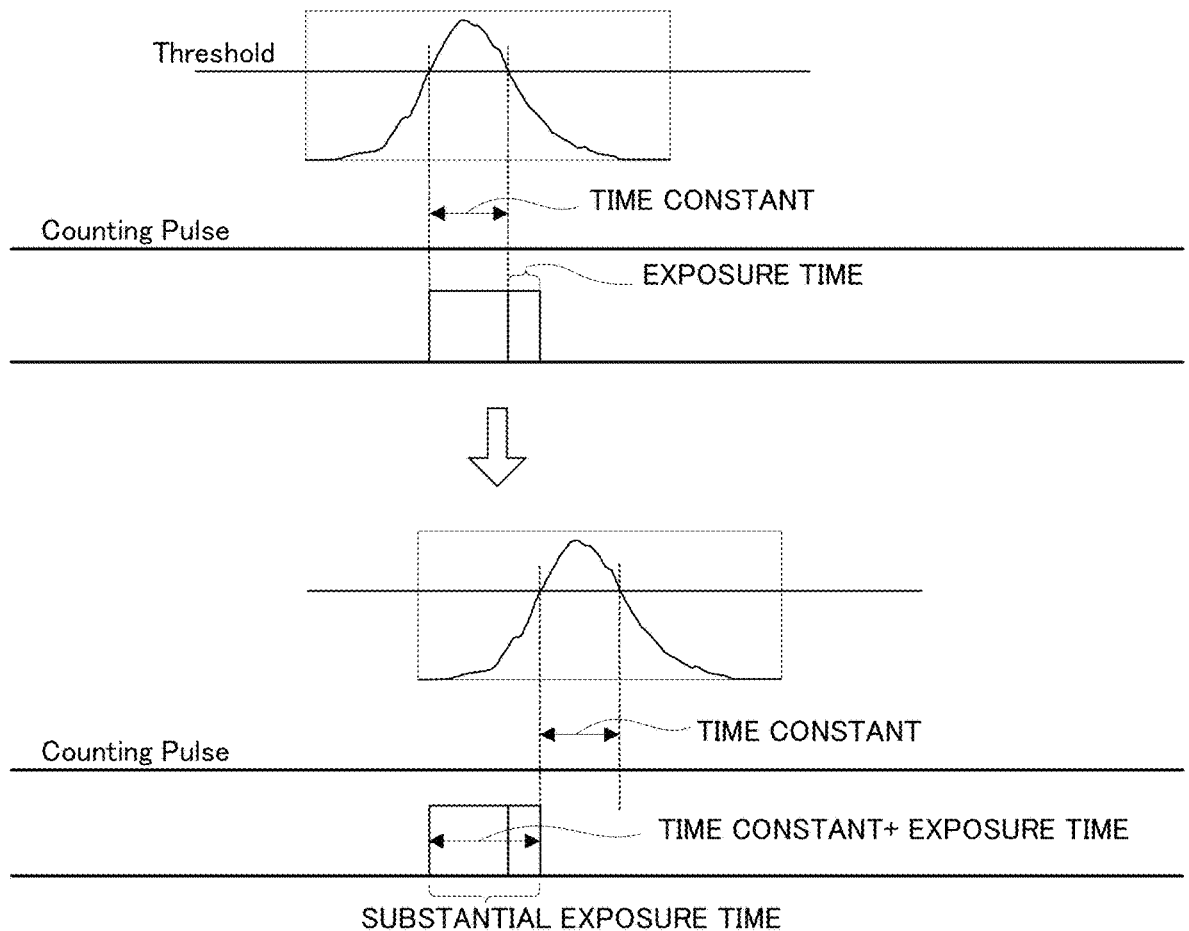
FIG. 6 is a schematic diagram showing the relationship between an exposure time δt and a time constant τ.

In addition, when the exposure time δt is shorter than the time constant τ, it is preferred that the value given by multiplying a value obtained by summing the exposure time δt and the time constant τ, by the number of times of exposure, is used for the total time $τ_{tot}$ of exposure. FIG. 6 is a schematic diagram showing the relationship between the exposure time δt and the time constant τ. The event of being counted within the exposure time δt is to be from the pulse generated earlier by an amount equivalent to the time constant τ with respect to the exposure time δt to the pulse generated just before the end of the exposure time δt, as shown in FIG. 6. In that case, the event of being counted within the exposure time δt is an event generated during (exposure time δt)+(time constant τ). Accordingly, there are some cases where the correction needs to be made by taking this effect into account, when integrating and outputting a plurality of acquired images, or the like.

(Conclusion)

As described above, exposure is repeated multiple times without counting at a timing when the pulse upwardly passes through a threshold, and the count value is calculated using a model in which an apparent time constant of the pulse signal monotonously decreases against increase in pulse detection ratio with respect to exposure, based on the output value and the pulse detection ratio that are obtained via a number of sampling results. In sampling, it is carried out to determine whether or not the pulse exceeds a threshold during the exposure time δt shorter than the time constant τ, until statistically becoming a significance number. In this manner, reduced can be influence of count loss even on a higher count rate that has not been able to be covered by a conventional method and correction thereof.

EXAMPLE (Measurement of Time Constant τ at Synchrotron Radiation Facilities)

The time constant τ of an X-ray detector according to EXAMPLE was measured by utilizing a train bunch of Spring-8 provided with experimental facilities and various auxiliary facilities for utilizing a series of accelerators with which electrons are accelerated and stored, and radiation generated therein. An X-ray detector is assembled as part of a radiation detector of Spring-8 to conduct the following measurements.

For example, according to Spring-8, an electron beam generated from an electron gun is accelerated to 1 GeV with a linear accelerator, and is subsequently introduced into a synchrotron to be accelerated to 8 GeV. This electron beam is introduced into a storage ring, and radiation is generated by a deflection electromagnet or an insertion beam source while maintaining an energy of 8 GeV. The generated radiation is introduced into an experimental station provided inside and outside a storage ring house through a beam line. In addition, basically, the electron beam is not continuously present inside the storage ring, but is present as an aggregate which is referred to as bunch.

Figure 7:
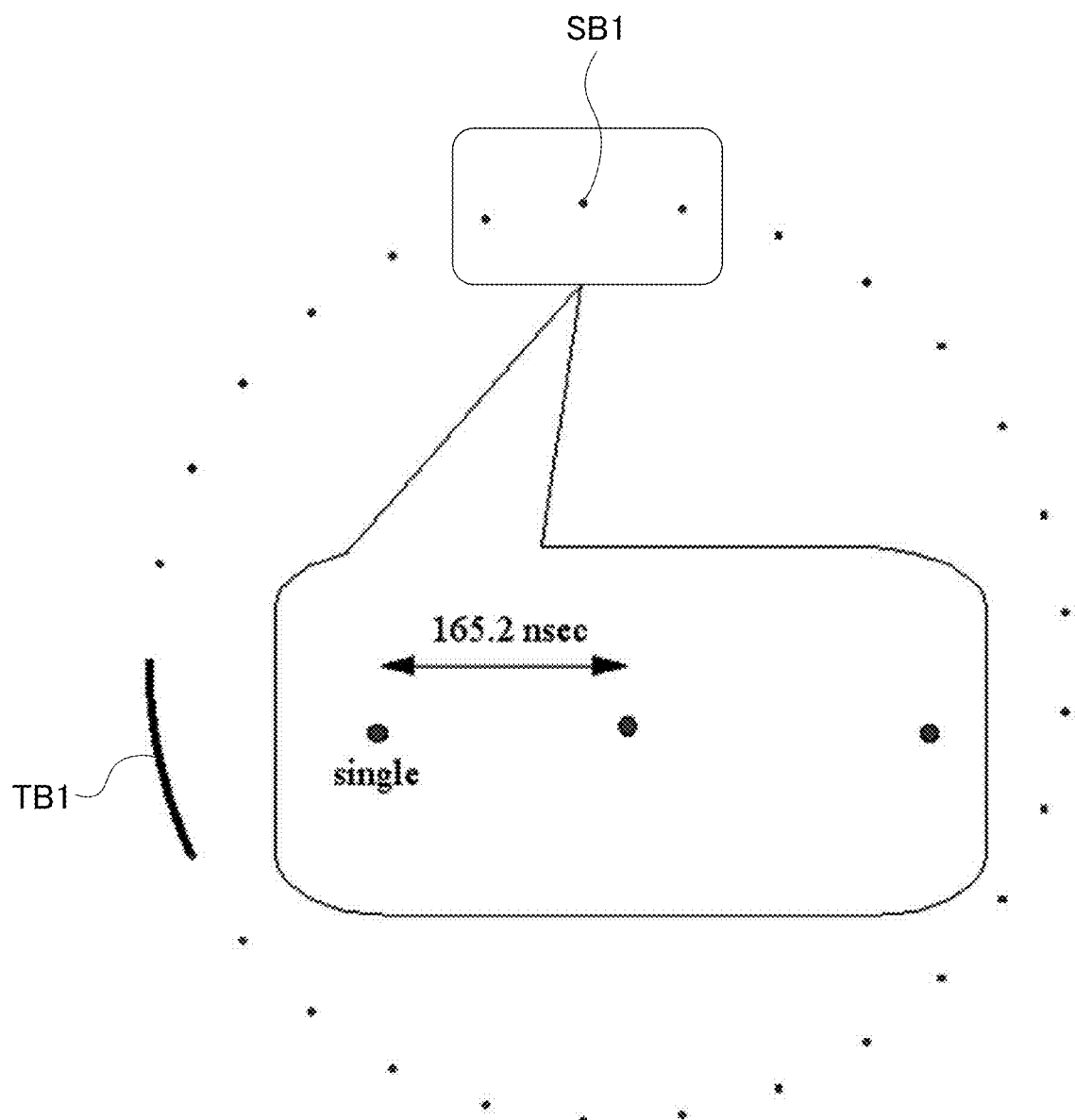
FIG. 7 is a diagram showing an example of a filing pattern inside a storage ring.
Figure 8:
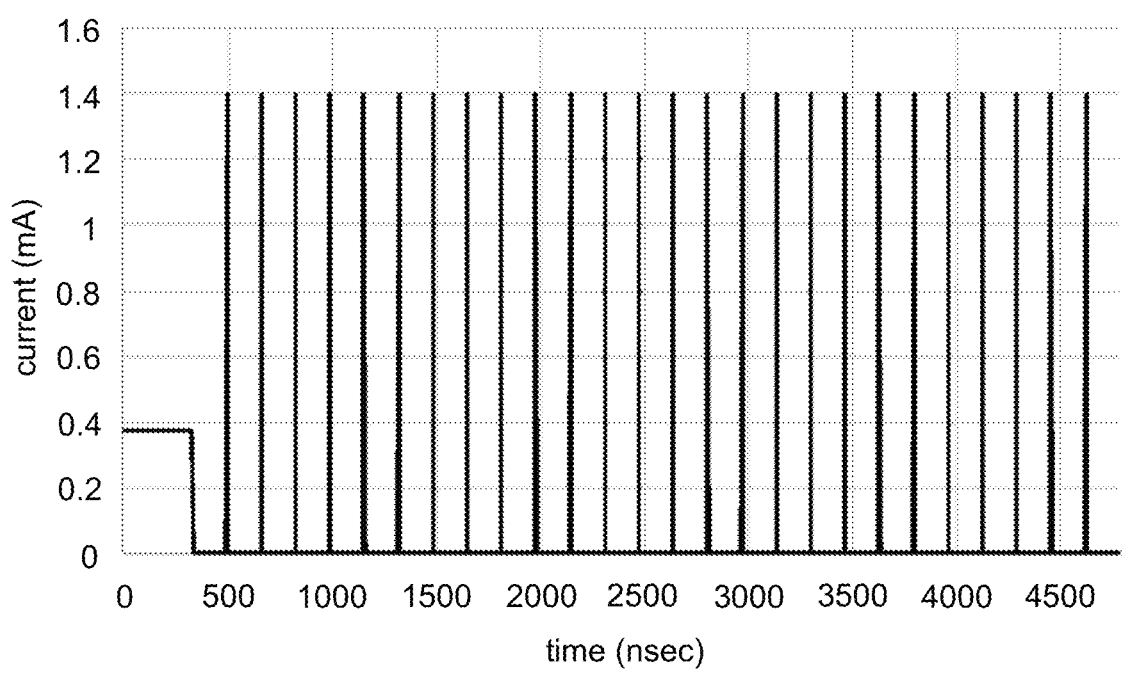
FIG. 8 is a diagram showing the detection current with respect to time.

FIG. 7 is a diagram showing an example of a filling pattern inside a storage ring. Further, FIG. 8 is a diagram showing the detection current of bunch with respect to time. Specifically, a filling pattern of 2018A (first half of 2018) several bunch operation mode (E mode) of Spring-8 is shown. A single bunch SB1 as a bunch of dotted electrons and a train bunch TB1 as a linearly successive bunch of electrons appear in the filling pattern shown in FIG. 7. The bunch flying interval in this operation mode is 165.2 nsec, and as shown in FIG. 8, the trapezoidal train bunch and the peak-like single bunch appear at the above-described time interval.

Figure 9:
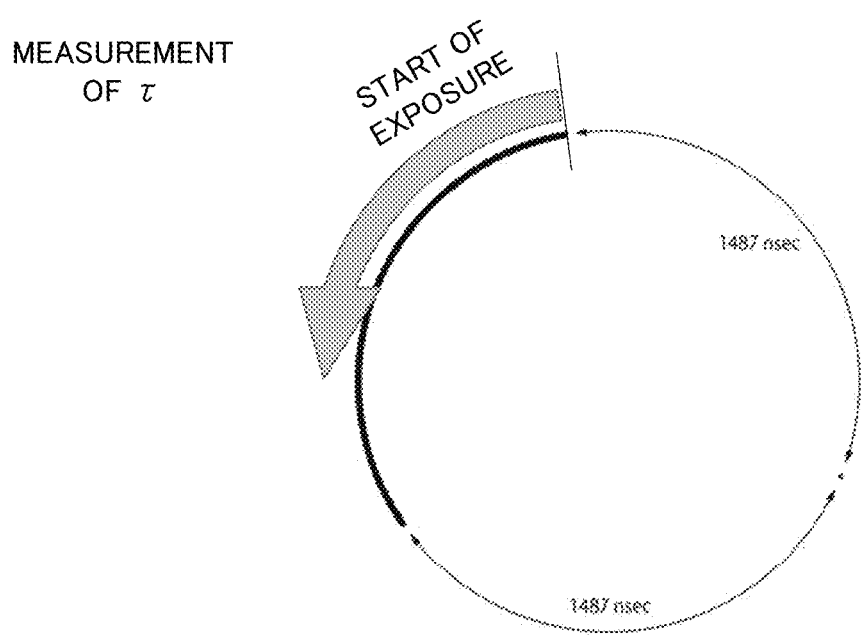
FIG. 9 is a diagram showing a filing pattern inside a storage ring, and an exposure start position according to the measurement of time constant.

A train bunch having an H mode bunch structure was used in the measurement of time constant τ this time. According to the experiment with the H mode bunch structure, there is an interval where no bunch flies. As shown in FIG. 9, when starting to conduct the measurement from a position where the bunch flies, no X-rays fly before gate-opening of the first 40 nsec, and thus the time constant τ can be measured based on the foregoing. Exposure was performed from a train start point; the exposure time was extended from 40 ns to 800 ns in units of 4 ns; detection was performed 10,000 times respectively; and the number of times per unit time of event was calculated to confirm the circuit operation time inside ROIC.

Figure 10:
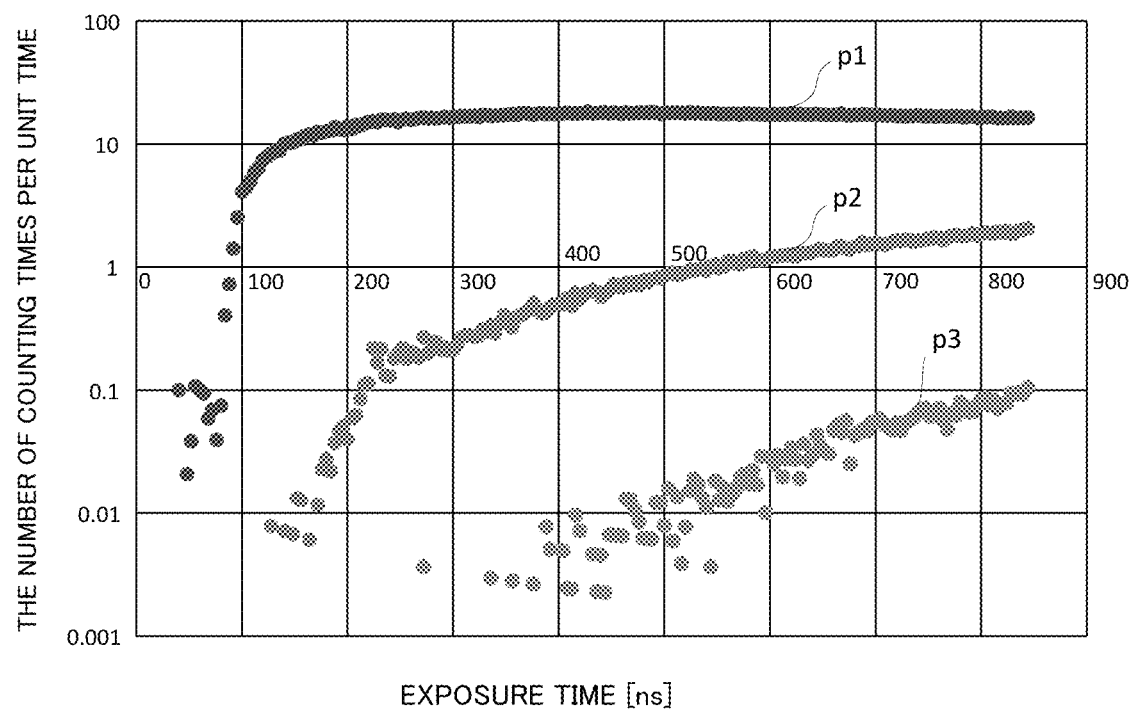
FIG. 10 is a graph showing the number of times per unit time of event for each count with respect to exposure time.

The curves p1, p2 and p3 in FIG. 10, respectively, represent the number of times per unit time of event of one count, two counts and three counts, respectively. That is, the measurements were conducted 10,000 times in 40 ns; and how many times out of them are one count, two counts and three counts are counted, respectively to calculate and plot the number of times per unit time. Next, the similar measurement was repeated in 44 ns.

As shown in FIG. 10, when the exposure time is gradually extended, the curve p2 rises, and the event of two counts emerges. In this measurement, when performing exposure only in a time shorter than the time constant τ, no event of two counts is generated, and thus a position where the event of two counts starts emerging represents the time constant τ. According to FIG. 10, a point where the two-counts graph falling toward 0 is approximately 100 ns, and thus it was recognized that the time constant τ of the X-ray detector according to EXAMPLE was approximately 100 ns. In addition, the measurements of time constant τ are not limited to the above-described method, but for example, it can be estimated from counts when the count rate is changed for readout.

Example 1

The X-ray measurement method according to the present invention is applicable for being used with an X-ray reflectivity method. According to the X-ray reflectivity method, there is a position where an intensity of reflected X-rays is high to a position where the intensity of reflected X-rays is low. Accordingly, it is preferred that the method according to the present invention is applied for the position where the intensity is high, and a conventional method is applied for the position where the intensity is low. For example, when 40 nsec exposure is applied 100 times for measurement, and 1 msec exposure is applied once separately from that for the measurement, even though there is an in-plane intensity distribution, it is possible to acquire data at the position where the intensity is low via 1 msec exposure, and it is possible to acquire data at the position where the intensity is high via 40 nsec exposure.

There is provided a method of conducting measurements by applying an attenuator to X-rays with higher count rate, for example, and attenuating an X-ray intensity to 1/10. In contrast, according to the present invention, the measurements can be conducted without applying the attenuator thereto. Accordingly, the configuration of the whole system becomes simple by an amount of attaching the attenuator thereto and detaching it therefrom. In addition, when being switched as described above, the switching operation is preferred to be performed by a software.

Example 2

The X-ray measurement method according to the present invention is applicable for being used in synchrotron radiation facilities such as Spring-8. In that case, the data obtained from a conventional X-ray detector attached to a radiation detector in the synchrotron radiation facilities are processed by utilizing an X-ray measurement method, a processing apparatus, or a program according to the present invention.

Other Examples

Other than those described above, according to total reflection caused by a metal complex sample, an X-ray small angle scattering method or the like out of single crystal X-ray diffraction methods, an intensity of X-rays to be measured becomes high, and thus it is suitable to use an X-ray measurement method according to the present invention.

(Simulation)

Figure 11:
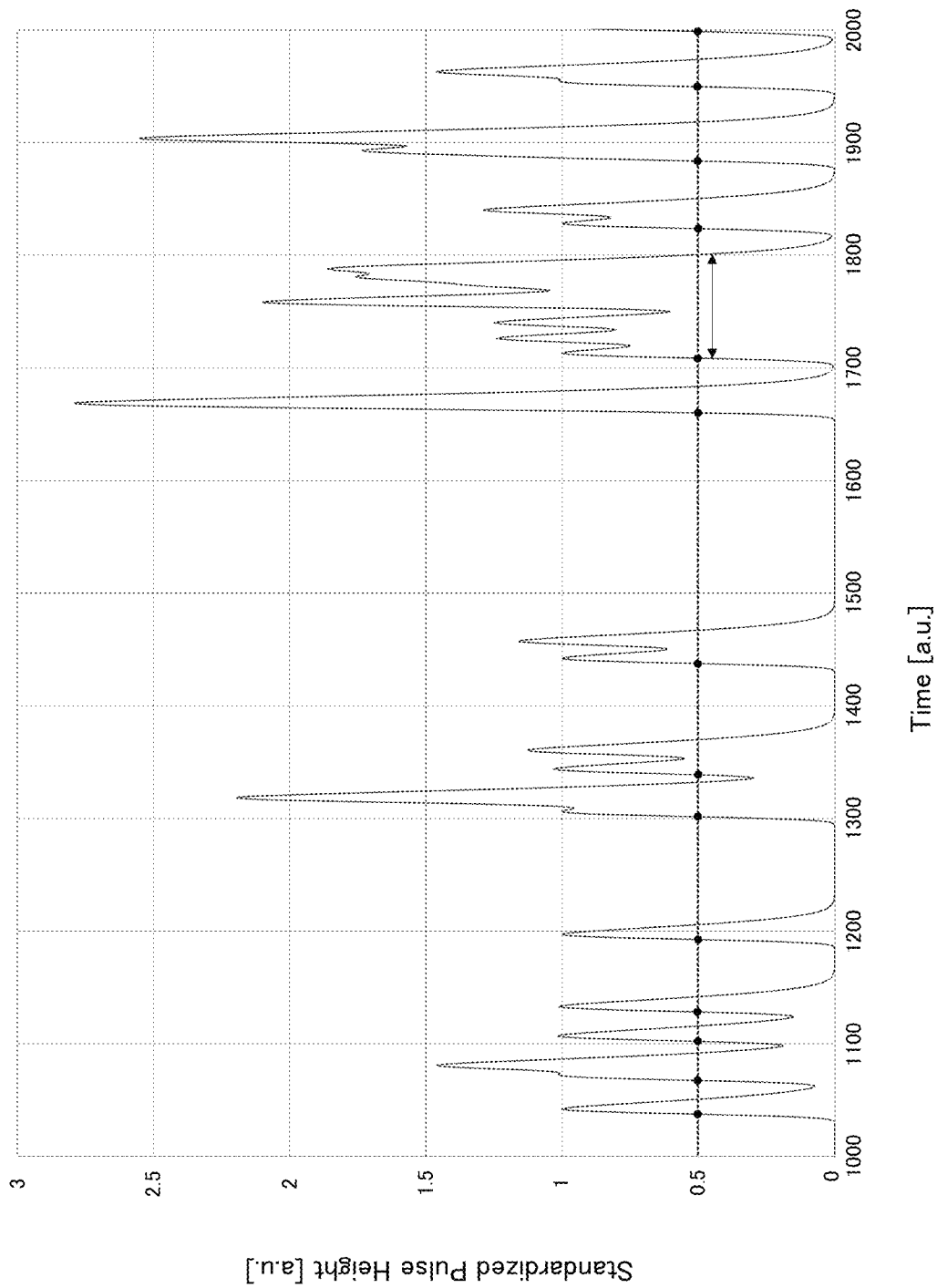
FIG. 11 is a schematic diagram showing a method of counting Rising Edge.
Figure 12:
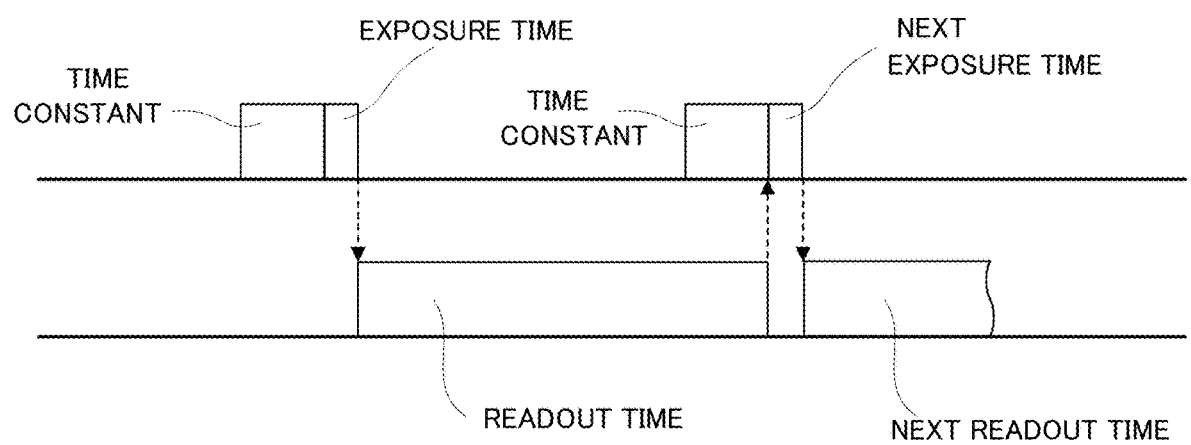
FIG. 12 is a schematic diagram showing the relationship between the exposure time δt, the time constant τ, and the readout time.

A comparison of the X-ray measurement method according to the present invention with a method of counting Rising Edge was simulated from computer experiment. FIG. 11 is a schematic diagram showing a method of counting Rising Edge. According to this method, counting at a position of each black circle on the graph shown in FIG. 11, that is, at a timing when the pulse upwardly passes through a threshold, is performed to determine an observed count rate per unit time from this. Count rates obtained by using a method of counting Rising Edge by generating pulses randomly with a computer for every input count rate, with respect to several count rates that are higher than 0 Mcps and are 20 Mcps or less, a method of subjecting each of count rates obtained from an output value to correcting of simple count loss, and an X-ray measurement method according to the present invention, respectively, are calculated. According to the method of subjecting each of count rates obtained from an output value to correcting of simple count loss, a count rate n was calculated using the following Formula (6). In addition, the count rate obtained from the measurement is represented by I. FIG. 12 is a schematic diagram showing the relationship between the exposure time δt, the time constant τ, and the readout time.

$$n = \frac{I}{1 - I \times \tau} \quad (6)$$

Figure 13:
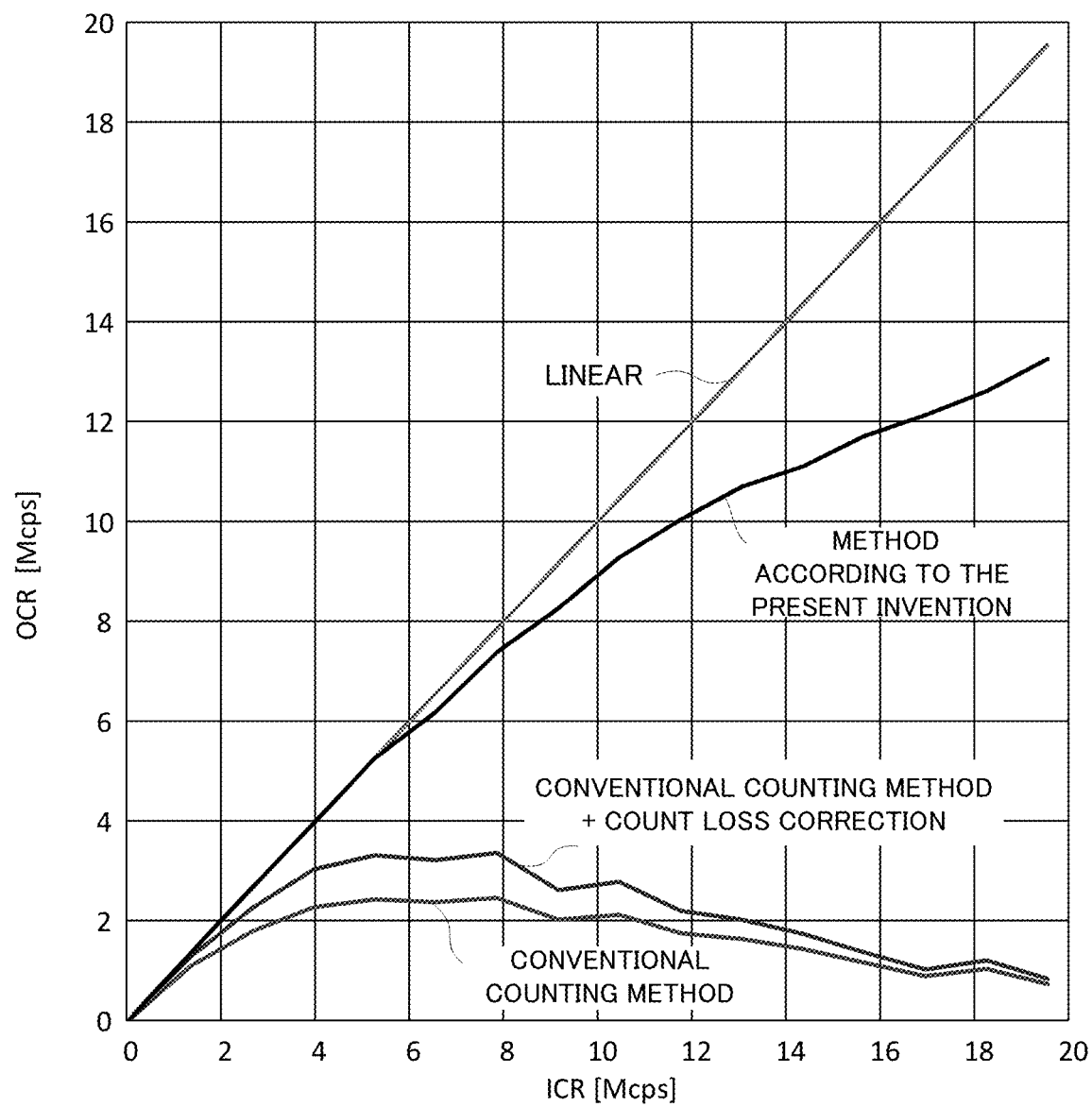
FIG. 13 is a graph representing a simulation result.

Further, in the X-ray measurement method according to the present invention, the count rate n was calculated using the above-described Formula (4). In addition, the exposure time δt and the time constant τ were applied similarly to those in the above-described Examples, and the count rate n was corrected by taking influence of the time constant τ into consideration. FIG. 13 is a graph representing the result.

As represented in FIG. 13, according to the method of counting Rising Edge, when the input pulse count rate exceeds 2 Mcps, the separation between the obtained count rate and a linear one gradually became higher, and when exceeding 6 Mcps, the obtained count rate was decreased. This is because pulses are frequently overlapped when the input pulse count rate becomes higher, and thus the event where each of the pulses upwardly passes through the threshold is difficult to occur. According to the method of subjecting the result obtained by counting Rising Edge to correcting of count loss, the obtained count rate thereof slightly becomes closer to the linear one than that of the conventional method, but the value as being a base of correction is a value counted by the conventional method, and thus there is no change in that the obtained count rate is decreased when the count rate of the input pulses becomes high.

In contrast, in the case of the X-ray measurement method according to the present invention, the separation from the linear one did not become large up to an input pulse count rate of approximately Mcps. Further, when exceeding 12 Mcps, the separation from the linear one somewhat became large, but the obtained count rate was not reduced. According to the X-ray measurement method of the present invention, the ranges of the reliable count rate are different in each model and formula, but calculation can be made up to infinity theoretically.

[Experiment]
[Experiment at Synchrotron Radiation Facilities]

ThScan was carried out with each of an exposure time of 40 ns and an exposure time of 16000 ns for keV X-rays using a train bunch of Spring-8 to confirm difference in profile shape. ThScan is a method of measuring an X-ray intensity while changing a threshold (Threshold) that is set for the measurement. As to the optical system, change of the intensity with respect to the threshold can be measured under the same exposure condition.

Figure 14:
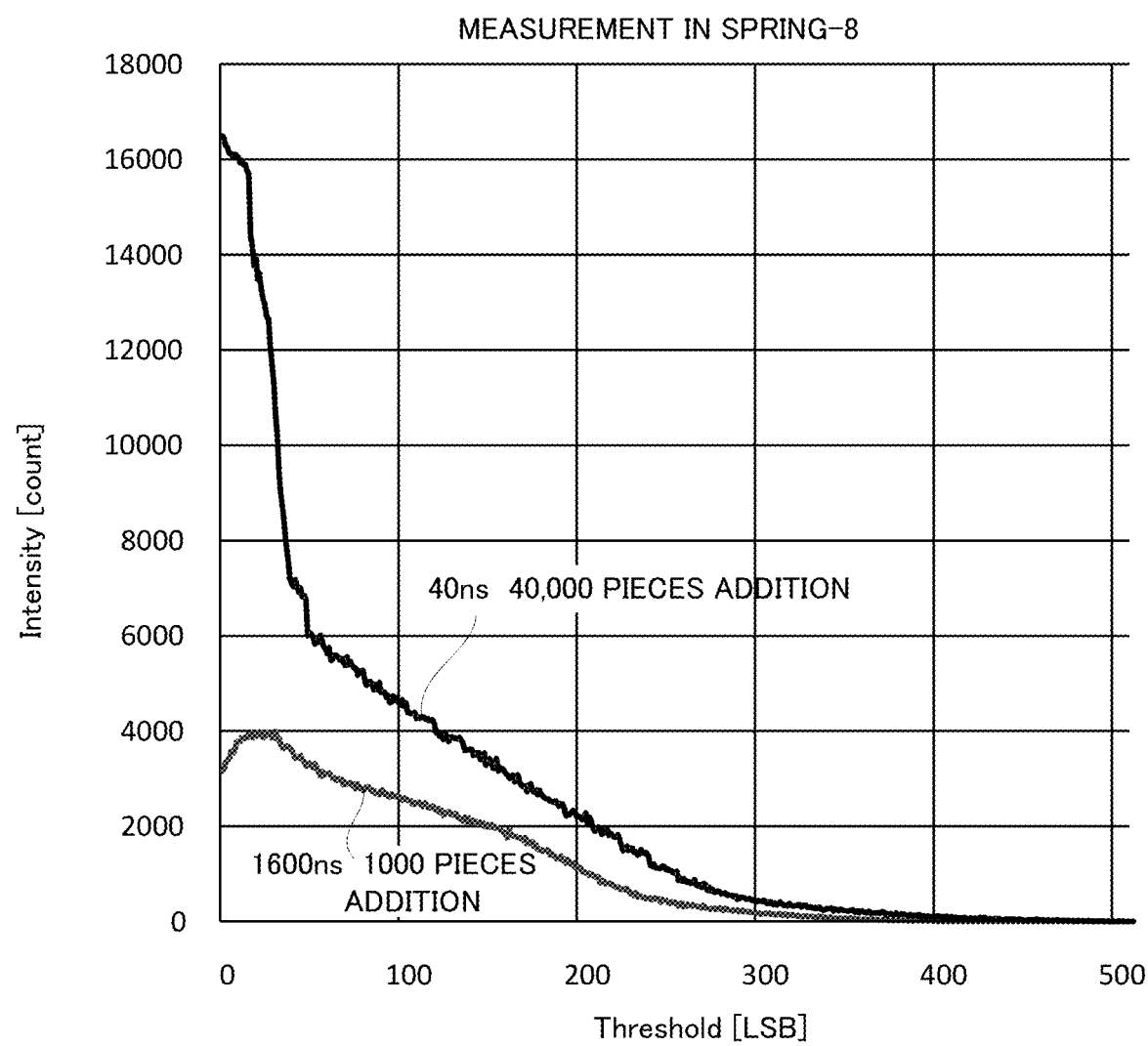
FIG. 14 is a graph representing an experimental result obtained at the synchrotron radiation facilities.

FIG. 14 is a graph representing the result. A clearly different profile was obtained as represented in FIG. 14. Effectiveness obtained by being set to the exposure time not more than the time constant, and counted was confirmed from this graph. In addition, according to the figure, in the case of an exposure time of 40 ns, since a substantial exposure time extends by an amount equivalent to the time constant, an amount of extension of exposure time at Threshold 5 keV is taken into consideration, thereby showing a graph of the value obtained by dividing it by 2.5. Taking the amount of extension of exposure time into consideration means that the sum of the exposure time and the time constant is used as a total time of exposure.

(Experiment by X-Ray Reflectivity Method)

Figure 15:
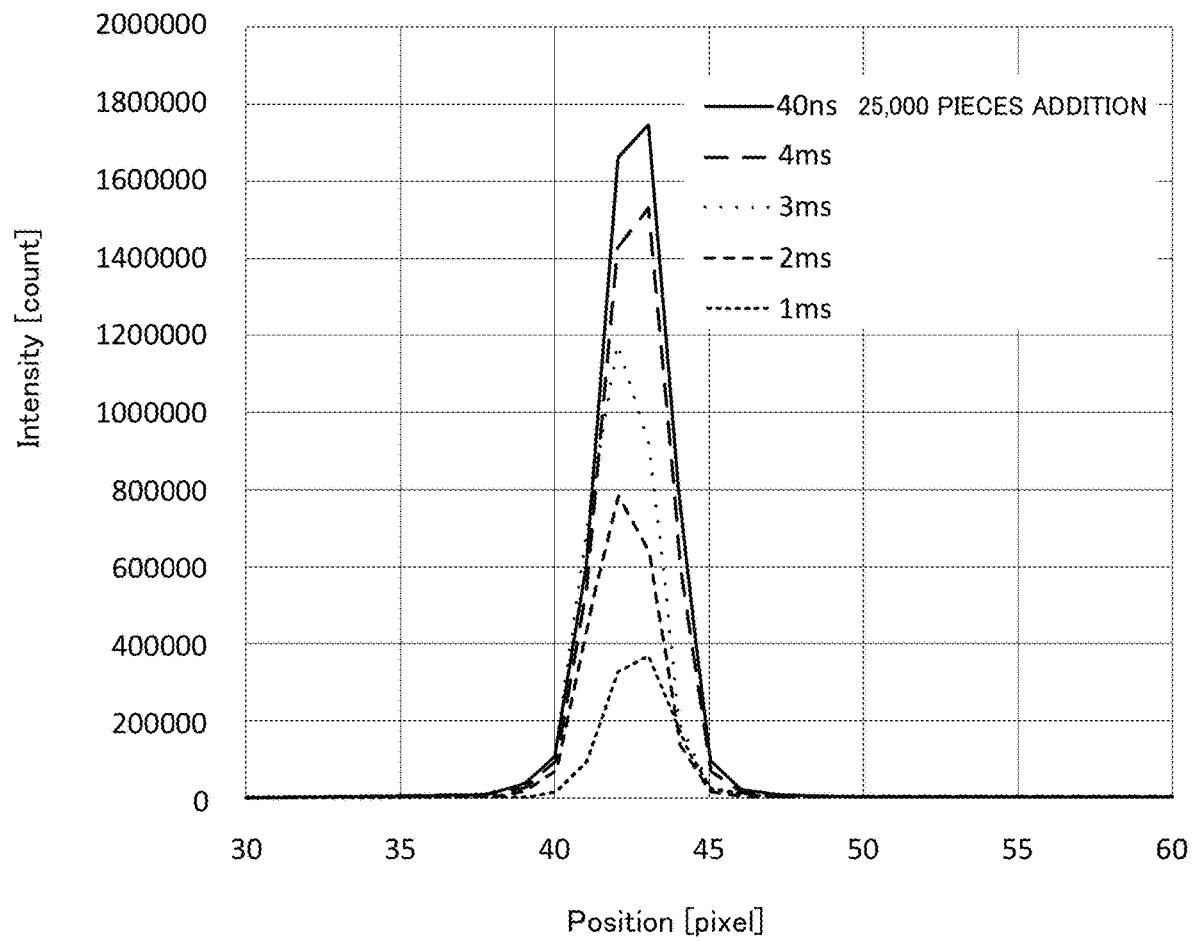
FIG. 15 is a graph representing an experimental result obtained by an X-ray reflectivity method.

Reflected X-rays of zinc oxide (ZnO) on a glass substrate were measured as an experiment by an X-ray reflectivity method. FIG. 15 is a graph representing the result. According to a graph obtained by subjecting the calculated result to adding of 25,000 pieces via 40 ns exposure, the time constant τ of an X-ray detector is 100 ns, and thus the substantial exposure time in total becomes 3.5 ms. In contrast, it is hardly necessary for a method of performing exposure of each of 1, 2, 3 and 4 ms to correct the exposure time. The 40 ns exposure case, though 3.5 ms exposure is substantially performed, has become higher in count rate than the 4 ms graph. In this manner, it is recognized that the influence of count loss is more able to be reduced by repeating exposure for a short duration than when performing exposure for a long duration.

EXPLANATION OF THE SYMBOLS

10 X-ray detection system
20 X-ray source
S Sample
100 X-ray detector
110 Sensor
120 Readout circuit
125 Gate
130 Detection circuit
140 Counter
150 Memory
160 Transfer circuit
170 Control circuit
200 Processing apparatus
210 Measurement data management section
220 Storage section
230 Calculation section
240 Correction section
300 Input section
400 Output section
SB1 Single bunch
TB1 Train bunch

The invention claimed is:

1. A processing apparatus comprising:
a storage section that stores an output value read out by counting a pulse signal of incident X-rays, by a photon-counting type semiconductor detector; and
a calculation section that calculates a count value based on the output value that has been read out,
wherein the calculation section uses a model in which an apparent time constant of the pulse signal monotonously decreases against increase in pulse detection ratio with respect to exposure.

2. The processing apparatus according to claim 1,
wherein the pulse detection ratio corresponds to a rate of a total time during which the pulse signal is detected with respect to the exposure, to a total time of the exposure.

3. The processing apparatus according to claim 1,
wherein the apparent time constant is a true time constant when the pulse detection ratio is zero.

4. The processing apparatus according to claim 1,
wherein the apparent time constant is a product of the true time constant and a constant smaller than 1 when the pulse detection ratio is 1.

5. The processing apparatus according to claim 1,
wherein the storage section stores a time constant of the pulse signal, and calculation section reads out and uses the stored time constant when using the model.

6. A system comprising the semiconductor detector, and the processing apparatus according to claim 1.

7. The system according to claim 6,
wherein the exposure is performed in a shorter time than the time constant of the pulse signal with the semiconductor detector.

8. The system according to claim 7,
wherein the count value is corrected with assuming that the pulse signal is counted in a time obtained by summing the time constant of the pulse signal and a unit time of the exposure, in the calculation of the count value.

9. An X-ray measurement method comprising the steps of:
reading out an output value by counting a pulse signal of incident X-rays, by a photon-counting type semiconductor detector; and
calculating a count value based on the output value that has been read out,
wherein a model in which an apparent time constant of the pulse signal monotonously decreases against increase in pulse detection ratio with respect to exposure is used in the step of calculating the count value.

10. A non-transitory computer readable recording medium having recorded thereon a program, the program causing a computer to execute the processes of:
reading out an output value by counting a pulse signal of incident X-rays, by a photon-counting type semiconductor detector; and
calculating a count value based on the output value that has been read out,
wherein a model in which an apparent time constant of the pulse signal monotonously decreases against increase in pulse detection ratio with respect to exposure is used in the processing of calculating the count value.

* * * * *